(12) United States Patent
Toyoda et al.

(10) Patent No.: US 8,498,204 B2
(45) Date of Patent: Jul. 30, 2013

(54) TRANSMISSION SYSTEM, REPEATER AND RECEIVER

(75) Inventors: Hidehiro Toyoda, Tachikawa (JP); Shinji Murai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 584 days.

(21) Appl. No.: 12/716,451

(22) Filed: Mar. 3, 2010

(65) Prior Publication Data
US 2010/0246389 A1 Sep. 30, 2010

(30) Foreign Application Priority Data

Mar. 26, 2009 (JP) ................................. 2009-075845

(51) Int. Cl.
*H04L 12/26* (2006.01)
(52) U.S. Cl.
USPC .......................................... 370/226; 370/228
(58) Field of Classification Search
USPC ................. 370/220, 226, 228, 330, 337, 336, 370/366, 395.1, 498, 466
See application file for complete search history.

(56) References Cited

U.S. PATENT DOCUMENTS

| 5,680,400 A | 10/1997 | York |
| 6,697,345 B1 * | 2/2004 | Corrigan et al. ............... 370/330 |
| 2002/0034194 A1 * | 3/2002 | Young et al. .................. 370/498 |
| 2002/0196492 A1 * | 12/2002 | Trisnadi et al. ................ 359/124 |
| 2004/0228278 A1 | 11/2004 | Bruckman et al. |
| 2005/0091383 A1 * | 4/2005 | Bender et al. .................. 709/228 |
| 2006/0203847 A1 | 9/2006 | Toyoda |
| 2007/0171912 A1 * | 7/2007 | Mitsumori .................. 370/395.1 |
| 2008/0175142 A1 * | 7/2008 | Uematsu ....................... 370/220 |
| 2009/0247068 A1 * | 10/2009 | Toyoda ............................. 455/8 |

FOREIGN PATENT DOCUMENTS

JP 2006-253852 A 9/2006

OTHER PUBLICATIONS

IEEE P802.3ba/D3.0, Clause 82, Physical Coding Sublayer (PCS) for 64B/66B, type 40GBASE-R and 100GBASE-R, Nov. 18, 2009.

* cited by examiner

*Primary Examiner* — Hassan Phillips
*Assistant Examiner* — Ajay Cattungal
(74) *Attorney, Agent, or Firm* — Mattingly & Malur, PC

(57) ABSTRACT

It is provided a data transmission system comprising a transmitter, a repeater and a receiver. The transmitter and the repeater are coupled through a first transmission path and the receiver and the repeater are coupled through a second transmission path. The transmitter, the repeater and the receiver have virtual lanes. The transmitter demultiplexes the transmission data into as many data streams as a number of useable virtual lanes based on useable lane information. The repeater monitors failures of the transmission lanes of the first transmission path and the virtual lanes. The receiver monitors failures of the transmission lanes of the second transmission path and the virtual lanes, selects the useable virtual lanes, sends to the transmitter the useable lane information, corrects a wrong order of the received data streams and a shift of reception point in the virtual lanes, and restores the demultiplexed data streams into the transmission data.

18 Claims, 12 Drawing Sheets

TRANSMISSION SYSTEM, REPEATER AND RECEIVER

CLAIM OF PRIORITY

The present application claims priority from Japanese patent application JP 2009-075845 filed on Mar. 26, 2009, the content of which is hereby incorporated by reference into this application.

BACKGROUND OF THE INVENTION

This invention relates to a data transmission system for transmitting data through a transmission path and, in particular, to a data transmission system that is capable of varying the number of lanes in a transmission path.

In the field of long-distance data transmission, the transmission speed of a method that uses a single transmission channel (also called a lane) to transmit data has reached a ceiling and lately it is difficult to enhance the transmission speed any higher. As a way to improve a communication band, technologies have been developed in which a plurality of lanes are bundled into a seemingly single link (lane bundling and deskew between lanes of a multi-lane link (multi-lane deskew)) (see, for example, JP 2006-253852 A and IEEE P802.3ba, Clause 82, "Physical Coding Sublayer (PCS) for 64B/66B, type 40 GBASE-R and 100 GBASE-R").

JP 2006-253852 A describes a transmission method that uses a plurality of lanes. An issue to be addressed in a transmission method that uses a multi-lane link is correcting a difference in transmission distance between lanes or, in the case of an optical transmission method, correcting a difference in data arrival time which is caused by a difference in light wavelength between lanes (difference in data arrival time between lanes is hereinafter referred to as skew). Also, the number of lanes needs to be varied to suit the type of transmission medium used. In JP 2006-253852 A, a data stream is demultiplexed to be divided among a plurality of virtual lanes on a code block basis and deskew between lanes is performed each time the number of lanes is changed in a repeater, thereby making it possible to change the number of transmission lanes while keeping the transmission capacity constant.

IEEE P802.3ba describes a transmission method that uses a plurality of lanes as a standardized technology of the 100 Gb/s Ethernet. The 100 Gb/s Ethernet mentions multi-lane transmission that accomplishes a transmission rate of 100 Gbps by bundling twenty 5-Gbps virtual lanes of data. An issue to be addressed in a transmission method that uses a multi-lane link is correcting a difference in transmission distance between lanes or, in the case of an optical transmission method, correcting a difference in data arrival time which is caused by a difference in light wavelength between lanes (difference in data arrival time between lanes is hereinafter referred to as skew). Also, the number of lanes needs to be varied to suit the type of transmission medium used.

In the 100 Gb/s Ethernet, a 100-Gbps data stream is demultiplexed to be divided among twenty virtual lanes on a code block basis and the twenty virtual lanes are multiplexed and demultiplexed on a bit basis, thereby making it possible to change the number of transmission lanes while keeping the transmission capacity constant.

SUMMARY OF THE INVENTION

However, in JP 2006-253852 A and IEEE P802.3ba, a failure in one of the lanes is deemed as a fault of the whole link and the whole link is disconnected. JP 2006-253852 A and IEEE P802.3ba therefore do not discuss a function of enhancing the fault tolerance by bypassing a failure that has occurred in one of the lanes.

This invention has been made in view of the above, and it is therefore an object of this invention to provide a transmission system for multi-lane transmission in which the number of lanes can be varied and which is enhanced in fault tolerance by bypassing a failure that has occurred in one of the lanes.

A representative aspect of this invention is as follows. That is, there is provided a transmission system for data transmission, comprising a transmitter, a repeater and a receiver. The transmitter sends data to the receiver. The repeater receives the data sent from the transmitter and transfers the received data to the receiver. The receiver receives the data sent from the repeater. The transmission system includes a first transmission path for coupling the transmitter and the repeater which receives the transmission data from the transmitter, and a second transmission path for coupling the receiver and the repeater, which sends the transmission data to the receiver. The first transmission path is configured with a first number of transmission lanes bundled together. The second transmission path is configured with a second number of transmission lanes bundled together. The transmitter, the repeater and the receiver have virtual lanes that can demultiplex data streams output from the first number of transmission lanes and multiplex data stream output from the virtual lanes into the second number of transmission lanes. The transmitter demultiplexes the transmission data into as many data streams as a number of useable virtual lanes based on useable lane information including information about the usable virtual lanes which is sent from the receiver, inserts the useable lane information and identifications for identifying the virtual lanes from which the data streams are output into the data streams output from the virtual lanes, multiplexes the data streams output from the virtual lanes into as many streams as the number of the transmission lanes of the first transmission path, and sends the multiplexed data streams to the repeater from the transmission lanes included in the first transmission path, so as to send the transmission data to the repeater. The repeater receives the multiplexed data streams from the transmission lanes included in the first transmission path, demultiplexes the received data streams into as many data streams as a number of the useable virtual lanes based on the useable lane information inserted in the received data streams, monitors failures of the transmission lanes of the first transmission path and the virtual lanes, inserts failure notification information into a data stream that is output from a virtual lane which has failed, multiplexes the data streams output from the virtual lanes into as many streams as a number of the transmission lanes of the second transmission path; and sends the multiplexed data streams from the transmission lanes included in the second transmission path to one of the receiver and another repeater, so as to send the transmission data to the one of the receiver and the another repeater. The receiver receives the multiplexed data streams from the transmission lanes included in the second transmission path, demultiplexes the received data streams into as many data streams as the number of the useable virtual lanes based on the useable lane information inserted into the received data streams, detects the identifications from the received data streams, monitors failures of the transmission lanes of the second transmission path and the virtual lanes, detects a fault lane based on results of the failure monitoring of the transmission lanes, selects the useable virtual lanes based on the failure notification information and a result of the fault lane detection, sends to the transmitter the useable lane information that includes information about the determined useable virtual lanes, corrects a wrong order of arrival of the received data streams and a shift of reception point in the virtual lanes which are caused by a skew of the data streams between the transmission lanes based on the detected identifications, and restores the demultiplexed data streams into the transmission data.

According to an aspect of this invention, only normal lanes are used while a failure that has occurred in one of transmission lanes is bypassed, and the communication capacity is reduced as well, so that connection is maintained. A transmission system with an enhanced fault tolerance is thus provided.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiment modes of this invention are described below with reference to FIGS. 1 to 12.

Figure 1:
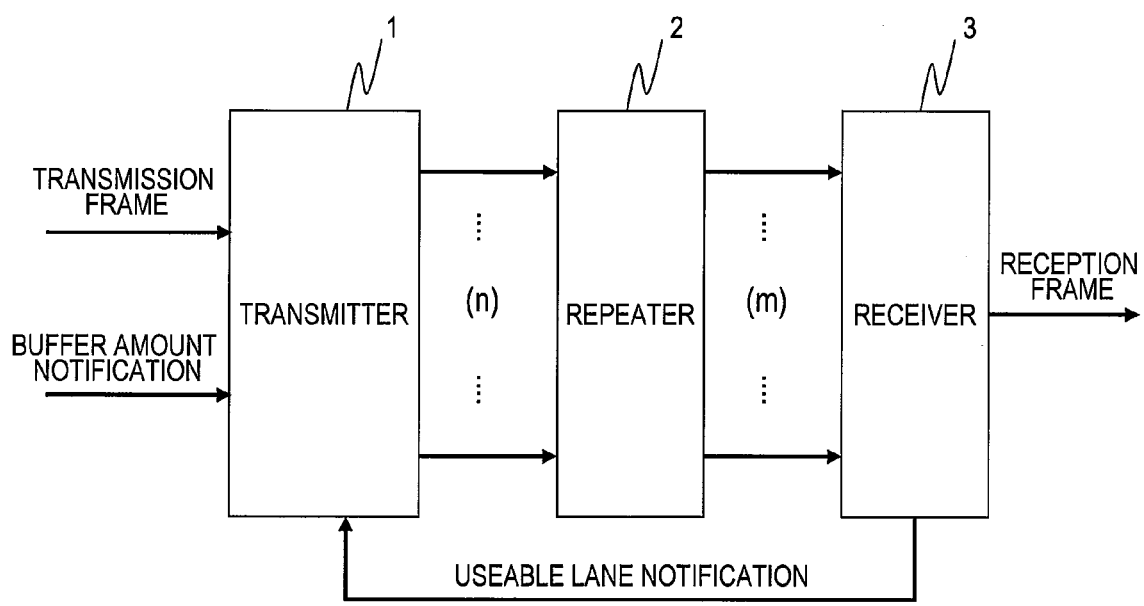
FIG. 1 is a diagram illustrating a configuration of a data transmission system according to an embodiment mode of this invention.

FIG. 1 is a diagram illustrating the configuration of a data transmission system according to an embodiment mode of this invention.

The data transmission system includes a transmitter 1, a repeater 2, and a receiver 3.

A transmission data frame (hereinafter referred to as transmission data), which is to be sent to the receiver 3, is input to the transmitter 1. The transmitter 1 demultiplexes the input transmission data to be output to n transmission lanes. The transmitter 1 also receives an input of useable lane information, which is output from the receiver 3.

The transmitter 1 is connected to the repeater 2 through a first transmission path, which is constituted of n physical lanes. Data output from the transmitter 1 is input to the repeater 2 through the first transmission path. The repeater 2 outputs the input data to the receiver 3 through a second transmission path, which is constituted of m physical lanes.

The numbers n and m are each an integer equal to or larger than 2, and are not equal to each other.

The repeater 2 is connected to the receiver 3 through the second transmission path, and data output from the repeater 2 is input to the receiver 3. The receiver 3 outputs the input data as a reception data frame (hereinafter referred to as reception data). The receiver 3 determines which lane is useable ultimately, and outputs information about the determined useable lane to the transmitter 1 as useable lane information.

In this invention, the useable lane information enables the transmitter 1 to transmit data over other transmission lanes than one where a failure has occurred.

Figure 2:
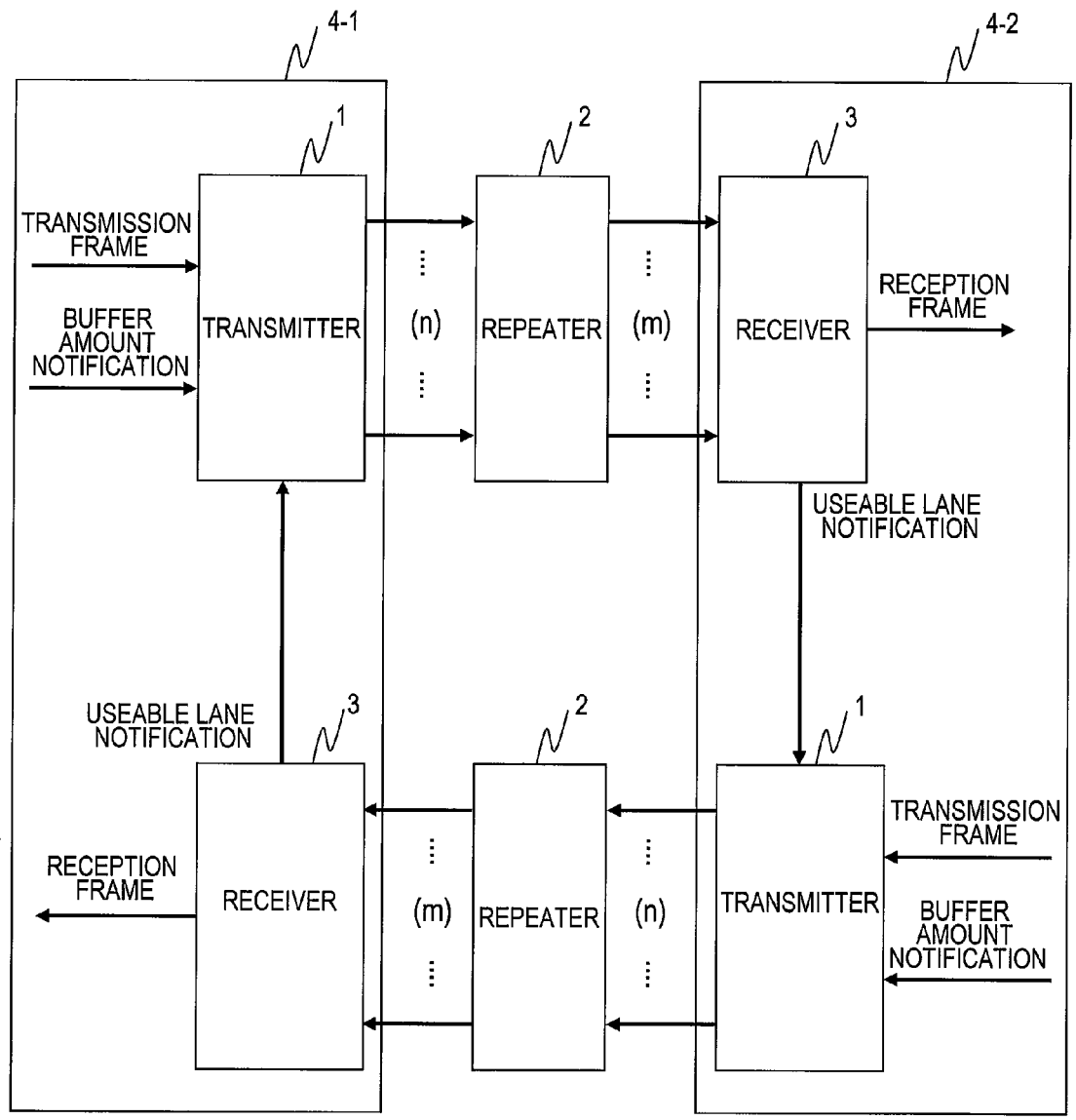
FIG. 2 is a diagram illustrating a configuration of a data transmission system according to another embodiment mode of this invention.

FIG. 2 is a diagram illustrating the configuration of a data transmission system according to another embodiment mode of this invention.

This data transmission system includes transceivers 4 (4-1 and 4-2), each of which has the transmitter 1 and the receiver 3, and the repeaters 2. As illustrated in FIG. 2, two transmission paths which have different directions from each other are provided between the transceiver 4-1 and the transceiver 4-2. This data transmission system differs from the embodiment mode of FIG. 1 in that the receivers 3 output useable lane notifications to the transmitters 1 over opposing transmission paths which have directions reverse to each other. The rest of the configuration in FIG. 2 is the same as in FIG. 1, and a description thereof is omitted here.

There may be a plurality of repeaters 2 between one transmitter 1 and one receiver 3.

First Embodiment

Figure 3:
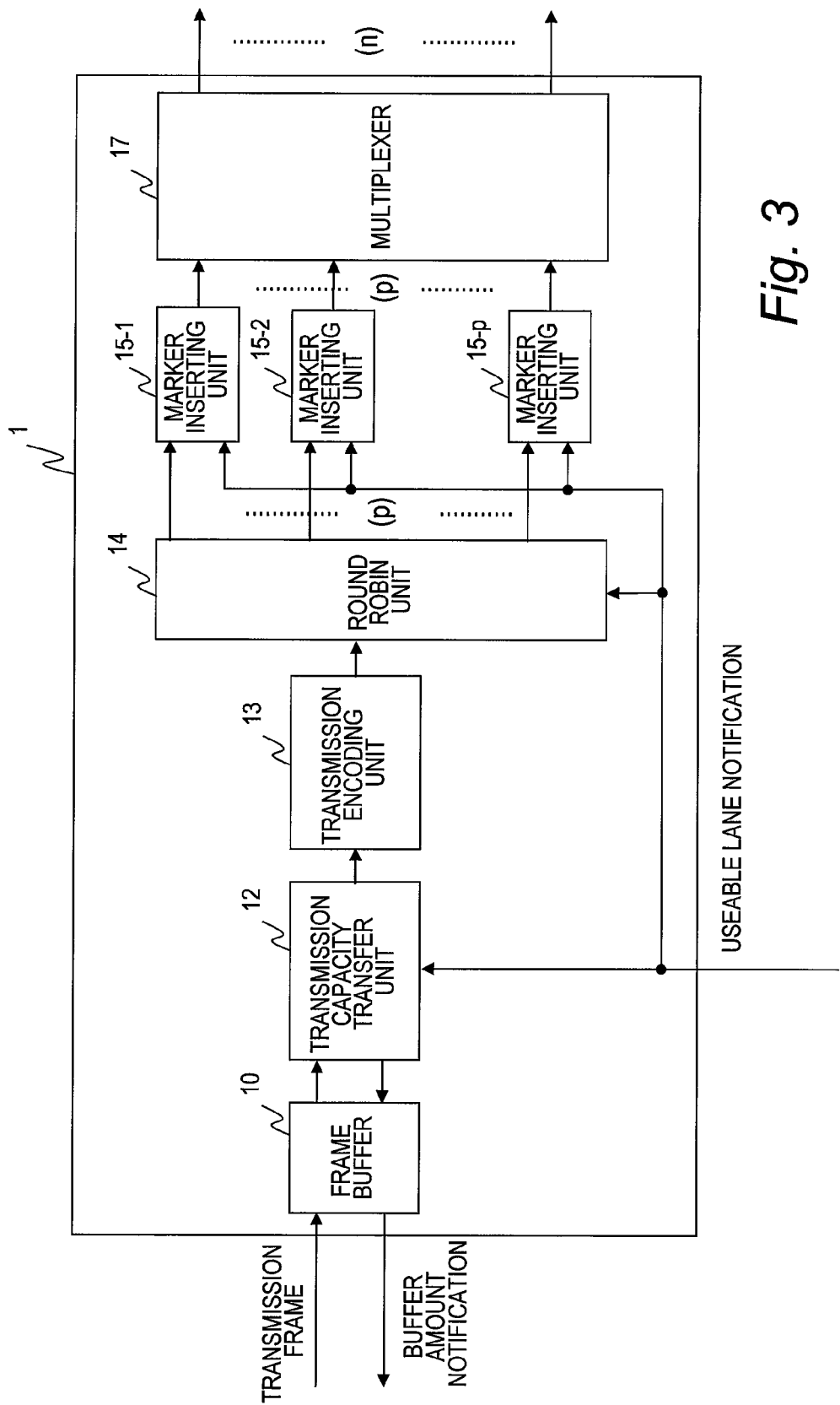
FIG. 3 is a block diagram illustrating a transmitter according to a first embodiment of this invention.

FIG. 3 is a block diagram illustrating the transmitter 1 according to a first embodiment of this invention.

The transmitter 1 includes a frame buffer 10, a transmission capacity transfer unit 12, a transmission encoding unit 13, a round robin unit 14, marker inserting units 15 (15-1 to 15-$p$), and a multiplexer 17.

The data flow of the transmitter 1 is described first.

Transmission data is input to the frame buffer 10. A data stream from the receiver 3 is input to the transmission capacity transfer unit 12, the round robin unit 14, and the marker inserting units 15 (15-1 to 15-$p$).

The frame buffer 10 outputs data streams to the output source of transmission data and to the transmission capacity transfer unit 12. The transmission capacity transfer unit 12 outputs data streams to the frame buffer 10 and to the transmission encoding unit 13. The transmission encoding unit 13 outputs a data stream to the round robin unit 14.

The round robin unit 14 outputs data streams to the marker inserting units 15 (15-1 to 15-$p$). The marker inserting units 15 (15-1 to 15-$p$) output data streams to the multiplexer 17. The multiplexer 17 outputs data streams to the first transmission path.

Detailed operations of the respective components of the transmitter 1 are described next.

Transmission data is input to the frame buffer 10. The frame buffer 10 sends a buffer amount notification to the sender of the transmission data, depending on the buffer amount, which is the amount of data accumulated in the frame buffer 10.

The sender of the transmission data stops sending transmission data based on the received buffer amount notification. The frame buffer 10 receives a reading request from the transmission capacity transfer unit 12 and outputs transmission data in response.

The transmission capacity transfer unit 12 receives useable lane information sent from the receiver 3 and, based on the received useable lane information, calculates the combined transmission capacities of lanes along a transmission path that are useable. For example, the combined transmission capacities can be calculated by multiplying the transmission capacity of a single lane by the number of useable lanes. The transmission capacity transfer unit 12 also uses a transmission data reading request to control the reading of the frame buffer 10 such that the amount of transmission data output from the frame buffer 10 equals the calculated transmission capacity.

The transmission encoding unit 13 converts a data stream of transmission data input from the transmission capacity transfer unit 12 into a transmission code (for example, the 64B/66B code), and outputs the transmission data to the round robin unit 14. This invention is not limited as to the conversion into a transmission code and the transmission data may be converted into other codes than the 64B/66B code.

The round robin unit 14 allocates transmission data in a cyclic manner to normal virtual lanes out of p virtual lanes, based on received useable lane information. The optimum way is to distribute transmission data on a code block basis of data encoded in the transmission encoding unit 13 (on a 66-bit data stream basis in the case of the 64B/66B code). The number p is preferably the least common multiple of the lane numbers (n and m) in a first transmission lane and a second transmission lane constituting transmission lanes.

Streams of transmission data demultiplexed to be divided among virtual lanes and transmitted concurrently are received at the receiver 3 with a difference in arrival time (skew) which is caused by a difference in transmission time between transmission routes. The marker inserting units 15 (15-1 to 15-$p$) therefore insert alignment markers, which enable the receiver 3 to detect a skew for each virtual lane, into data streams of transmission data.

The multiplexer 17 multiplexes transmission data input from the p marker inserting units (15-1 to 15-$p$) into as many streams as the number of transmission lanes in the transmission path (x transmission lanes), and outputs the multiplexed transmission data to the first transmission path. The number x is n in this embodiment.

An example of alignment markers inserted by the marker inserting units 15 is described next.

In this embodiment, a 66-bit length fixed pattern is defined as an alignment marker to be inserted, and the marker inserting units (15-1 to 15-$p$) each insert the alignment marker in a data stream at regular intervals.

Of the sixty-six bits of the alignment marker, two bits are allocated to header information, thirty-two bits are allocated to alignment information, and the remaining thirty-two bits are allocated to the inverted value of the alignment information. The alignment information (thirty-two bits) specifically contains five bits that indicate a virtual lane number, five bits that indicate the transmission capacity (number of virtual lanes used), and one bit that indicates a failure notification.

Figure 4:
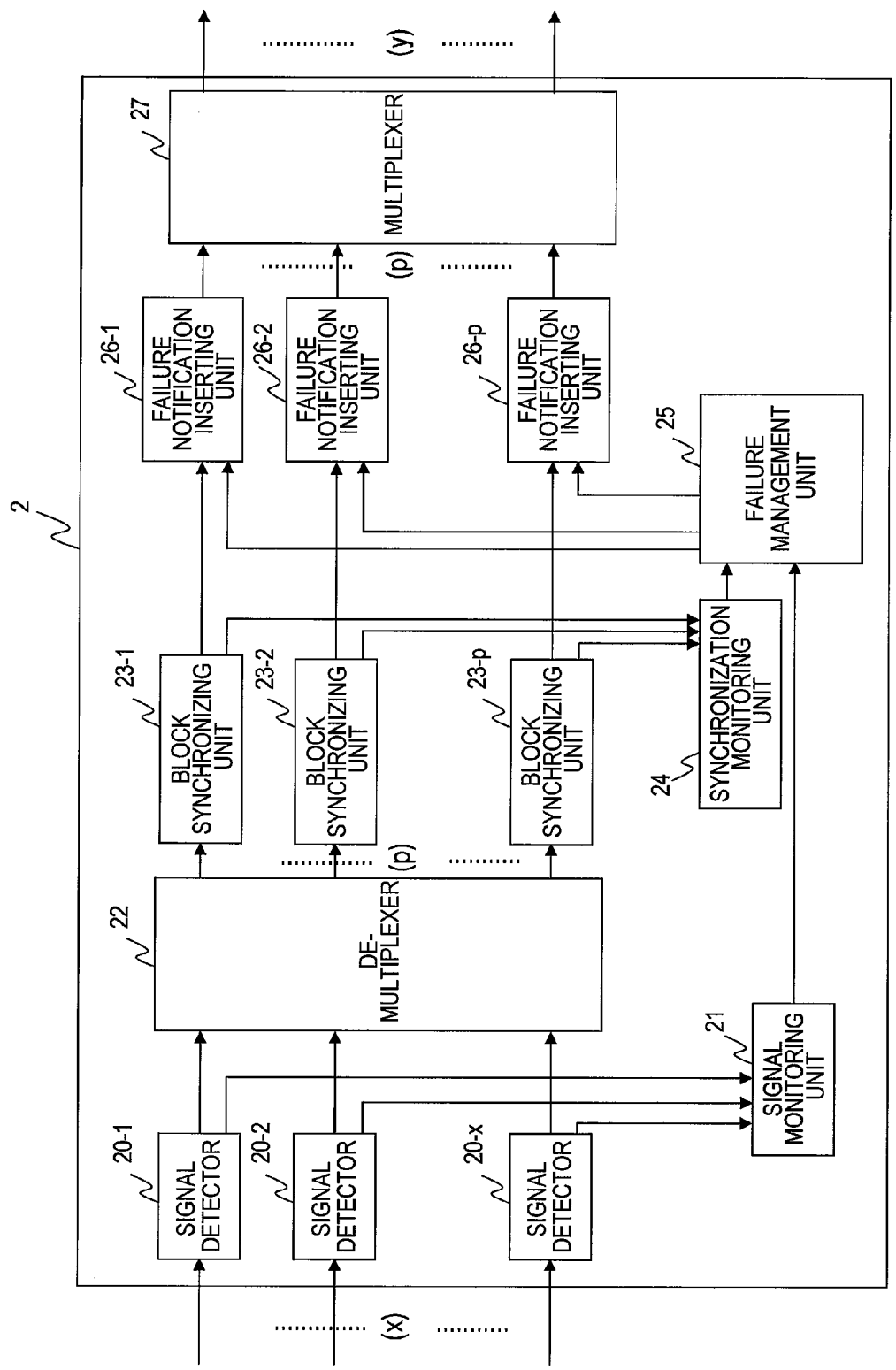
FIG. 4 is a block diagram illustrating a repeater according to the first embodiment of this invention.

FIG. 4 is a block diagram illustrating the repeater 2 according to the first embodiment of this invention.

The repeater 2 receives an input of data streams from a transmission path that is constituted of x transmission lanes, and outputs data streams to a transmission path that is constituted of y transmission lanes. In this embodiment, where the first transmission path is constituted of n transmission lanes and the second transmission path is constituted of m transmission lanes, x equals n and y equals m.

The repeater 2 includes x signal detectors (20-1 to 20-$x$), a signal monitoring unit 21, a demultiplexer 22, p block synchronizing units (23-1 to 23-$p$), a synchronization monitoring unit 24, a failure management unit 25, p failure notification inserting units (26-1 to 26-$p$), and a multiplexer 27.

The data flow of the repeater 2 is described first.

Transmission data streams sent from the transmitter 1 are input through the first transmission path to the plurality of signal detectors (20-1 to 20-$x$) provided in the repeater 2.

The signal detectors (20-1 to 20-$x$) separately output data streams to the signal monitoring unit 21 and the demultiplexer 22. The signal monitoring unit 21 outputs data streams to the failure management unit 25. The demultiplexer 22 includes p output units from which data streams are output to the p block synchronizing units (23-1 to 23-$p$) separately.

The block synchronizing units (23-1 to 23-$p$) separately output data streams to the synchronization monitoring unit 24 and the failure notification inserting units (26-1 to 26-$p$). The synchronization monitoring unit 24 output data streams to the failure management unit 25.

The failure management unit 25 includes p output units from which data streams are output to the failure notification inserting units (26-1 to 26-$p$) separately. The failure notification inserting units (26-1 to 26-$p$) separately output data streams to the multiplexer 27. The multiplexer 27 includes y output units from which data streams are output to the second transmission path.

The operation of the repeater 2 is described next in detail.

Transmission data streams sent from the transmitter 1 are input through the first transmission path to the plurality of signal detectors (20-1 to 20-$x$) provided in the repeater 2.

The signal detectors (20-1 to 20-$x$) execute clock synchronization processing of the data streams, and output the received data streams to the demultiplexer 22. The signal detectors (20-1 to 20-$x$) also detect the input of a data signal and notify detection results to the signal monitoring unit 21.

The signal monitoring unit 21 monitors the detection results notified from the signal detectors (20-1 to 20-$x$), and notifies the failure management unit 25 of failures occurring in the transmission lanes of the first transmission path. The demultiplexer 22 receives an input of data streams from the signal detectors (20-1 to 20-$x$), divides the input data streams among p virtual lanes, and outputs the divided data streams to the block synchronizing units (23-1 to 23-$p$).

The block synchronizing units (23-1 to 23-$p$) synchronize code blocks of transmission data encoded in the transmission encoding unit 13 of the transmitter 1, align the code blocks for each virtual lane, and separately output data streams of the aligned code blocks to the failure notification inserting units (26-1 to 26-$p$). The block synchronizing units (23-1 to 23-$p$) also notify block synchronization states to the synchronization monitoring unit 24.

The synchronization monitoring unit 24 monitors the code block synchronization results notified from the block synchronizing units (23-1 to 23-$p$), and notifies the failure management unit 25 of failures occurring in the virtual lanes of the first transmission path.

For instance, the synchronization monitoring unit 24 monitors a bit stream that is contained in a data stream output from each virtual lane and that indicates the start point of a code block and, when the bit stream is not received properly, determines that a failure is occurring in this virtual lane. In other words, a data stream output from a virtual lane contains a bit stream for a synchronization use and, when the bit stream is not received within a given time interval, it is determined that the virtual lane is suffering a failure.

Based on the transmission lane-basis failure notification from the signal monitoring unit 21 and the virtual lane-basis block synchronization failure notification from the synchronization monitoring unit 24, the failure management unit 25 identifies which virtual lane is suffering a failure. The failure management unit 25 labels the identified virtual lane as a fault lane, and notifies the identification result to the failure notification inserting units (26-1 to 26-*p*).

The failure notification inserting units (26-1 to 26-*p*) inform the receiver 3 of the fact that a failure has occurred in a virtual lane by inserting failure notification information into input data streams at sites where the marker inserting units (15-1 to 15-*p*) of the transmitter 1 have inserted alignment markers. In this embodiment, a 66-bit fixed value (p types, p corresponding to the number of virtual lanes), which differs from the p different alignment markers inserted by the marker inserting units (15-1 to 15-*p*) of the transmitter 1, is uniquely defined as an alignment marker that is used in the event of a failure. The failure notification inserting units (26-1 to 26-*p*) insert this alignment marker only in virtual lanes where failures have occurred.

The multiplexer 27 multiplexes data stream input from the p failure notification inserting units (26-1 to 26-*p*) into as many streams as the number of transmission lanes in the transmission path (y transmission lanes), and outputs the multiplexed data stream to the second transmission path. The number y is m in this embodiment.

Figure 5:
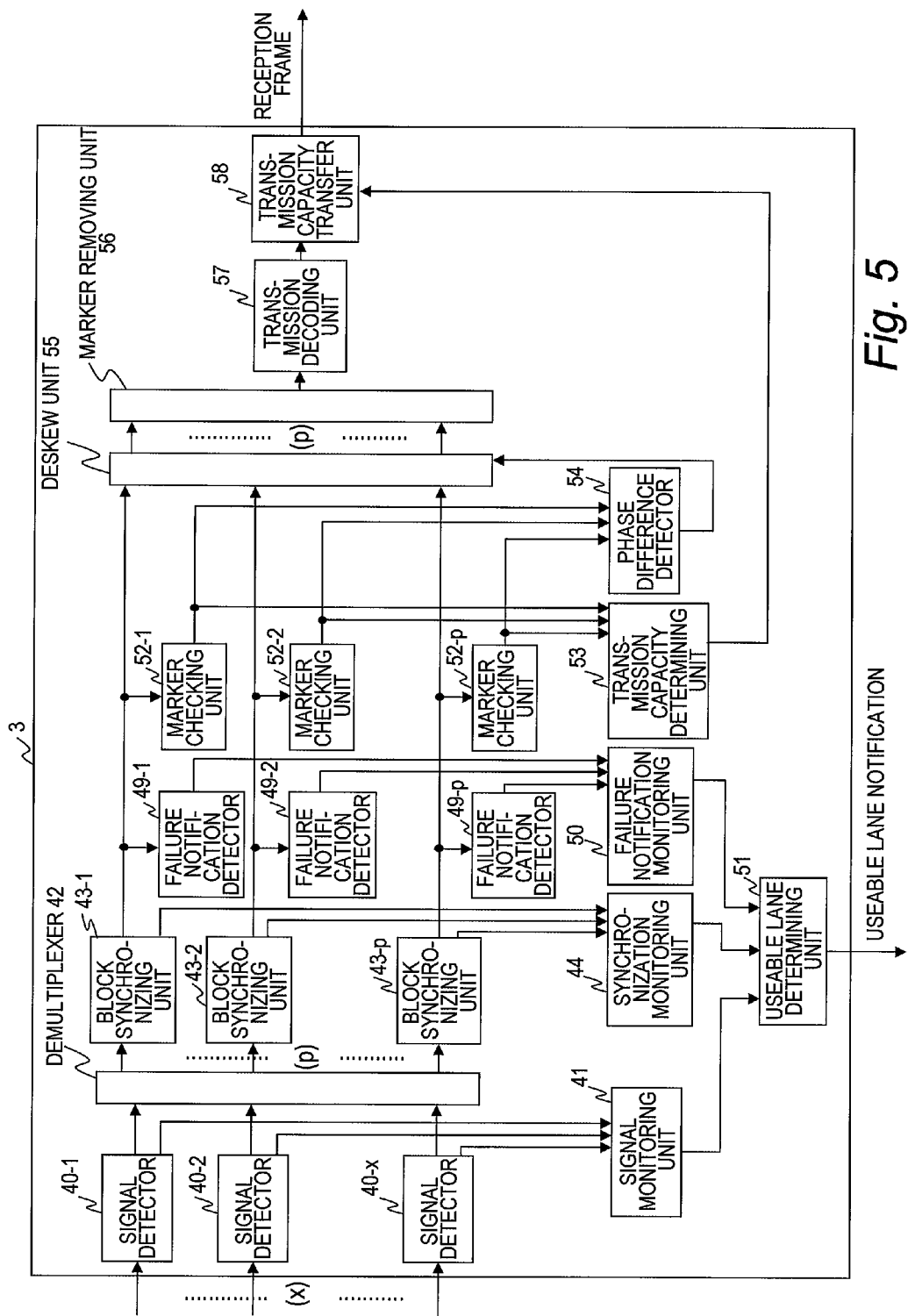
FIG. 5 is a block diagram illustrating a receiver according to the first embodiment of this invention.

FIG. 5 is a block diagram illustrating the receiver 3 according to the first embodiment of this invention.

The receiver 3 receives an input of data streams from a transmission path that is constituted of x transmission lanes (or the last transmission path), and outputs reception frame data (hereinafter referred to as reception data) and useable lane information.

The receiver 3 includes signal detectors (40-1 to 40-*x*), a signal monitoring unit 41, a demultiplexer 42, block synchronizing units (43-1 to 43-*p*), a synchronization monitoring unit 44, failure notification detectors (49-1 to 49-*p*), a failure notification monitoring unit 50, a useable lane determining unit 51, marker checking units (52-1 to 52-*p*), a transmission capacity determining unit 53, a phase difference detector 54, a deskew unit 55, a marker removing unit 56, a transmission decoding unit 57, and a transmission capacity transfer unit 58.

The data flow of the receiver 3 is described first.

Data streams output from the repeater 2 through the second transmission path are separately input to the signal detectors (40-1 to 40-*x*). The signal detectors (40-1 to 40-*x*) output data streams to the demultiplexer 42 and to the signal monitoring unit 41. The signal monitoring unit 41 outputs data streams to the useable lane determining unit 51.

The demultiplexer 42 includes p output units from which data streams are output to the p block synchronizing units (43-1 to 43-*p*) separately. The block synchronizing units (43-1 to 43-*p*) separately output data streams to the synchronization monitoring unit 44, the failure notification detectors (49-1 to 49-*p*), the marker checking units (52-1 to 52-*p*), and the deskew unit 55. The synchronization monitoring unit 44 outputs data streams to the useable lane determining unit 51.

The failure notification detectors (49-1 to 49-*p*) separately output data streams to the failure notification monitoring unit 50. The failure notification monitoring unit 50 outputs data streams to the useable lane determining unit 51. The useable lane determining unit 51 outputs data streams to the transmitter 1. The marker checking units (52-1 to 52-*p*) output data streams to the transmission capacity determining unit 53 and the phase difference detector 54.

The transmission capacity determining unit 53 outputs data streams to the transmission capacity transfer unit 58. The phase difference detector 54 outputs data streams to the deskew unit 55. The deskew unit 55 includes p virtual lanes through which data streams are output to the marker removing unit 56. The marker removing unit 56 outputs data streams to the transmission decoding unit 57. The transmission decoding unit 57 outputs data streams to the transmission capacity transfer unit 58. The transmission capacity transfer unit 58 ultimately outputs reception data.

The operation of the receiver 3 is described next in detail.

Transmission data streams sent from the repeater 2 are input through the second transmission path to the plurality of signal detectors (40-1 to 40-*x*) provided in the receiver 3.

The signal detectors (40-1 to 40-*x*) execute clock synchronization processing of the data streams, and output the received data streams to the demultiplexer 42. The signal detectors (40-1 to 40-*x*) also detect the input of a data signal and notify detection results to the signal monitoring unit 41.

The signal monitoring unit 41 monitors the detection results notified from the signal detectors (40-1 to 40-*x*), and notifies the useable lane determining unit 51 of failures occurring in the transmission lanes of the second transmission path. The demultiplexer 42 receives an input of data streams from the signal detectors (40-1 to 40-*x*), divides the input data streams among p virtual lanes, and outputs the divided data streams to the block synchronizing units (43-1 to 43-*p*).

The block synchronizing units (43-1 to 43-*p*) synchronize code blocks of transmission data encoded in the transmission encoding unit 13 of the transmitter 1, align the code blocks for each virtual lane, and separately output data streams of the aligned code blocks to the failure notification inserting units (49-1 to 49-*p*), the marker checking units (52-1 to 52-*p*), and the deskew unit 55. The block synchronizing units (43-1 to 43-*p*) also notify block synchronization states to the synchronization monitoring unit 44.

The synchronization monitoring unit 44 monitors the code block synchronization results notified from the block synchronizing units (43-1 to 43-*p*), and notifies the useable lane determining unit 51 of failures occurring in the virtual lanes of the second transmission path.

For instance, the synchronization monitoring unit 44 monitors a bit stream that is contained in a data stream output from each virtual lane and that indicates the start point of a code block and, when the bit stream is not received properly, determines that a failure is occurring in this virtual lane. In other words, a data stream output from a virtual lane contains a bit stream for a synchronization use and, when the bit stream is not received within a given time interval, it is determined that the virtual lane is suffering a failure.

The signal monitoring unit 41 and the synchronization monitoring unit 44 detect a failure in the transmission path (physical lanes or virtual lanes) between the repeater 2 and the receiver 3.

The failure notification detectors (49-1 to 49-*p*) separately detect virtual lane failure information inserted by the failure notification inserting units (26-1 to 26-*p*) of the repeater 2 and notify detection results to the failure notification monitoring unit 50.

The failure notification monitoring unit 50 monitors the failure notification information notified from the failure notification detectors (49-1 to 49-*p*), and notifies the useable lane determining unit 51 of failures that have occurred in virtual lanes of the transmission path. The failure notification monitoring unit 50 detects a failure in the transmission path (physical lanes or virtual lanes) between the transmitter 1 and the repeater 2.

Based on the information that has been notified from one or more of the monitoring units, the useable lane determining unit 51 monitors a lane fault and determines which virtual lane is useable. The useable lane determining unit 51 sends useable lane information which indicates virtual lanes to be used to the transmitter 1.

The marker checking units (52-1 to 52-$p$) check alignment markers to extract transmission capacity information inserted by the marker inserting units (15-1 to 15-$p$) of the transmitter 1, and notify the extracted transmission capacity information to the transmission capacity determining unit 53. The marker checking units (52-1 to 52-$p$) also notify virtual lane numbers and detection timing to the phase difference detector 54.

The transmission capacity determining unit 53 monitors the transmission capacity information notified from the marker checking units (52-1 to 52-$p$) to detect that the transmission capacity has been changed in the transmitter 1, and determines the number of virtual lanes that are currently used by the transmitter 1, i.e., the new transmission capacity. The transmission capacity determining unit 53 then notifies information on the new transmission capacity to the transmission capacity transfer unit 58.

Based on the virtual lane numbers and the detection timing which are notified from the marker checking units (52-1 to 52-$p$), the phase difference detector 54 determines the phase difference between virtual lanes, i.e., the skew amount, and the reception points of the virtual lanes. The phase difference detector 54 notifies the skew amount and the reception points of the virtual lanes to the deskew unit 55.

Based on the skew amount and the reception points of the virtual lanes which have been notified from the phase difference detector 54, the deskew unit 55 corrects for each virtual lane a difference in arrival time and a shift in reception point, and outputs the received data streams to the marker removing unit 56 in a correct order of virtual lanes. The marker removing unit 56 outputs the received data streams to the transmission decoding unit 57 after removing the alignment markers that have been inserted in the data streams by the marker inserting units (15-1 to 15-$p$) of the transmitter 1.

The transmission decoding unit 57 outputs the received data streams to the transmission capacity transfer unit 58 after decoding the data streams that have been encoded by the transmission encoding unit 13 of the transmitter 1 into the original data streams. The transmission capacity transfer unit 58 uses such measures as bundling data streams that are transmitted through currently used virtual lanes and widening the interval of an invalid signal between data frames until a transmission capacity determined by the transmission capacity determining unit 53 is reached. The transmission capacity transfer unit 58 thus converts data streams to have the maximum transmission capacity of the transmission path and outputs reception frame data.

An operation example concerning how a fault lane is determined is described next.

The signal detectors (40-1 to 40-$x$) detect signal states such as no signal being detected or the signal strength being smaller than a given value, and notify the signal states to the signal monitoring unit 41.

The block synchronizing units (43-1 to 43-$p$) notify the synchronization monitoring unit 44 of information such as a failure to lock code block synchronization or synchronization being unlocked.

The failure notification detectors (49-1 to 49-$p$) detect from the failure notification information contained in the alignment markers that a failure has occurred in a virtual lane of the transmission path leading to the repeater 2, and notify the failure notification monitoring unit 50 of the failure.

The useable lane determining unit 51 receives an input of failure monitoring results from the signal monitoring unit 41, the synchronization monitoring unit 44, and the failure notification monitoring unit 50, and, when determining that a virtual lane has seriously deteriorated in reliability, sends to the transmitter 1 useable lane information that informs that this virtual lane is unuseable.

Specifically, the useable lane determining unit 51 determines that a physical lane is not available for use when failure monitoring results from the signal monitoring unit 41 show that the signal strength (e.g., voltage) of a signal output from the physical lane has been equal to or less than a preset threshold for a given period of time.

In the case where the 64B/66B code is employed, when failure monitoring results from the synchronization monitoring unit 44 show that, for example, a bit stream having a header that indicates an error has been kept input from a virtual lane at given time intervals until the error rate exceeds a preset threshold, the useable lane determining unit 51 unlocks block synchronization and determines that this virtual lane is unuseable. The useable lane determining unit 51 also determines a virtual lane as unuseable when the number of times block synchronization is unlocked in the virtual lane exceeds a preset value.

The useable lane determining unit 51 also determines that a virtual lane is not available for use when failure monitoring results from the failure notification monitoring unit 50 show that failure information has been detected in association with the virtual lane.

Based on the above determination results, the useable lane determining unit 51 creates a useable lane notification that contains information about virtual lanes excluding virtual lanes that are determined as unuseable and virtual lanes from which data streams are output to physical lanes that are determined as unuseable. The created useable lane notification is sent to the transmitter 1. The transmitter 1 utilizes the information about useable virtual lanes which is contained in the useable lane notification to avoid using physical lanes where failures are happening.

According to the first embodiment, by using normal transmission lanes and reducing the communication capacity as well, the connection of a link as a whole can be maintained despite failures in some of the transmission lanes in the first transmission path and in the second transmission path.

Second Embodiment

A second embodiment of this invention is described with reference to FIGS. 6 and 7. The second embodiment and the first embodiment use different methods to notify the receiver 3 of a failure that has occurred in a virtual lane. The transmitter 1 of the second embodiment is the same as the transmitter 1 of the first embodiment, and a description thereof is therefore omitted here. The following description of the second embodiment focuses on differences from the first embodiment.

Figure 6:
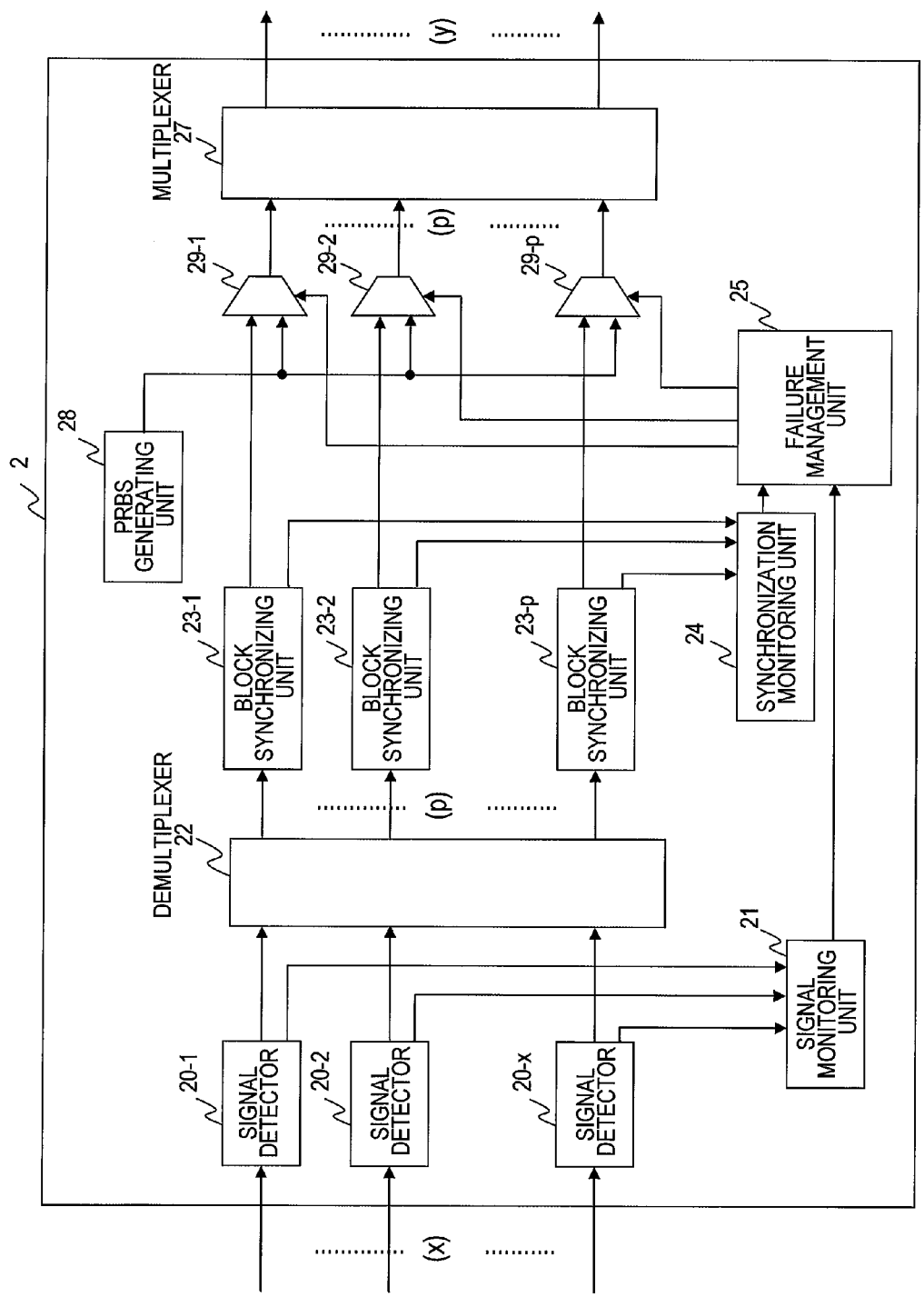
FIG. 6 is a block diagram illustrating a repeater according to a second embodiment of this invention.

FIG. 6 is a block diagram illustrating the repeater 2 according to the second embodiment of this invention.

The repeater 2 of the second embodiment includes the x signal detectors (20-1 to 20-$x$), the signal monitoring unit 21, the demultiplexer 22, the p block synchronizing units (23-1 to 23-$p$), the synchronization monitoring unit 24, the failure management unit 25, a PRBS generating unit 28, p selectors (29-1 to 29-$p$), and the multiplexer 27.

The repeater 2 of the second embodiment differs from that of the first embodiment in that the PRBS generating unit 28 and the p selectors (29-1 to 29-$p$) are provided, and the failure notification inserting units (26-1 to 26-$p$) are omitted.

The data flow of the repeater 2 in the second embodiment is described first.

Transmission data streams sent from the transmitter 1 are input through the first transmission path to the plurality of signal detectors (20-1 to 20-x) provided in the repeater 2.

The signal detectors (20-1 to 20-x) separately output data streams to the signal monitoring unit 21 and the demultiplexer 22. The signal monitoring unit 21 outputs data streams to the failure management unit 25. The demultiplexer 22 includes p output units from which data streams are output to the p block synchronizing units (23-1 to 23-p) separately.

The block synchronizing units (23-1 to 23-p) separately output data streams to the synchronization monitoring unit 24 and the p selectors (29-1 to 29-p). The synchronization monitoring unit 24 outputs data streams to the failure management unit 25. The PRBS generating unit 28 outputs data streams to the p selectors (29-1 to 29-p). The failure management unit 25 includes p output units from which data streams are output to the p selectors (29-1 to 29-p) separately. The p selectors (29-1 to 29-p) separately output data streams to the multiplexer 27. The multiplexer 27 includes y output units from which data streams are output to the second transmission path.

The operation of the repeater 2 of the second embodiment is described next. The x signal detectors (20-1 to 20-x), the signal monitoring unit 21, the demultiplexer 22, the p block synchronizing units (23-1 to 23-p), and the synchronization monitoring unit 24 in the repeater 2 of the second embodiment operate the same way as in the first embodiment. A description of these components is therefore omitted here.

The PRBS generating unit 28 generates random bit streams that are guaranteed in DC-balance and finite run length, and outputs the bit streams to the p selectors (29-1 to 29-p). This enables the transmission system to avoid malfunction or the like of the receiver 3 that is caused by an input of a data stream from a virtual lane where a failure has occurred. Also, the receiver 3 can detect a failure in a virtual lane by detecting a specific random bit stream. The operation of the receiver 3 to detect a failure in a virtual lane is described later with reference to FIG. 7.

The random bit streams guaranteed in DC-balance and finite run length are, when constituted of "0" and "1," for example, bit streams that make data streams received within a given time interval contain an equal number of "0" and "1".

Based on the transmission lane-basis failure notification from the signal monitoring unit 21 and the virtual lane-basis block synchronization failure notification from the synchronization monitoring unit 24, the failure management unit 25 identifies which virtual lane is suffering a failure. The failure management unit 25 labels the identified virtual lane as a fault lane, and notifies the lane fault information (normal/abnormal state) to the selectors (29-1 to 29-p).

Based on the lane fault information which is notified from the failure management unit 25, the p selectors (29-1 to 29-p) select the data streams input from the block synchronizing units (23-1 to 23-p) when the lanes are in a normal state and the random bit streams input from the PRBS generating unit 28 when the lanes are not in a normal state. The selectors (29-1 to 29-p) separately output the selected streams to the multiplexer 27.

The multiplexer 27 multiplexes data stream input from the p selectors (29-1 to 29-p) into as many streams as the number of transmission lanes in the transmission path (y transmission lanes), and outputs the multiplexed data stream to the second transmission path. The number y is m in this embodiment.

Figure 7:
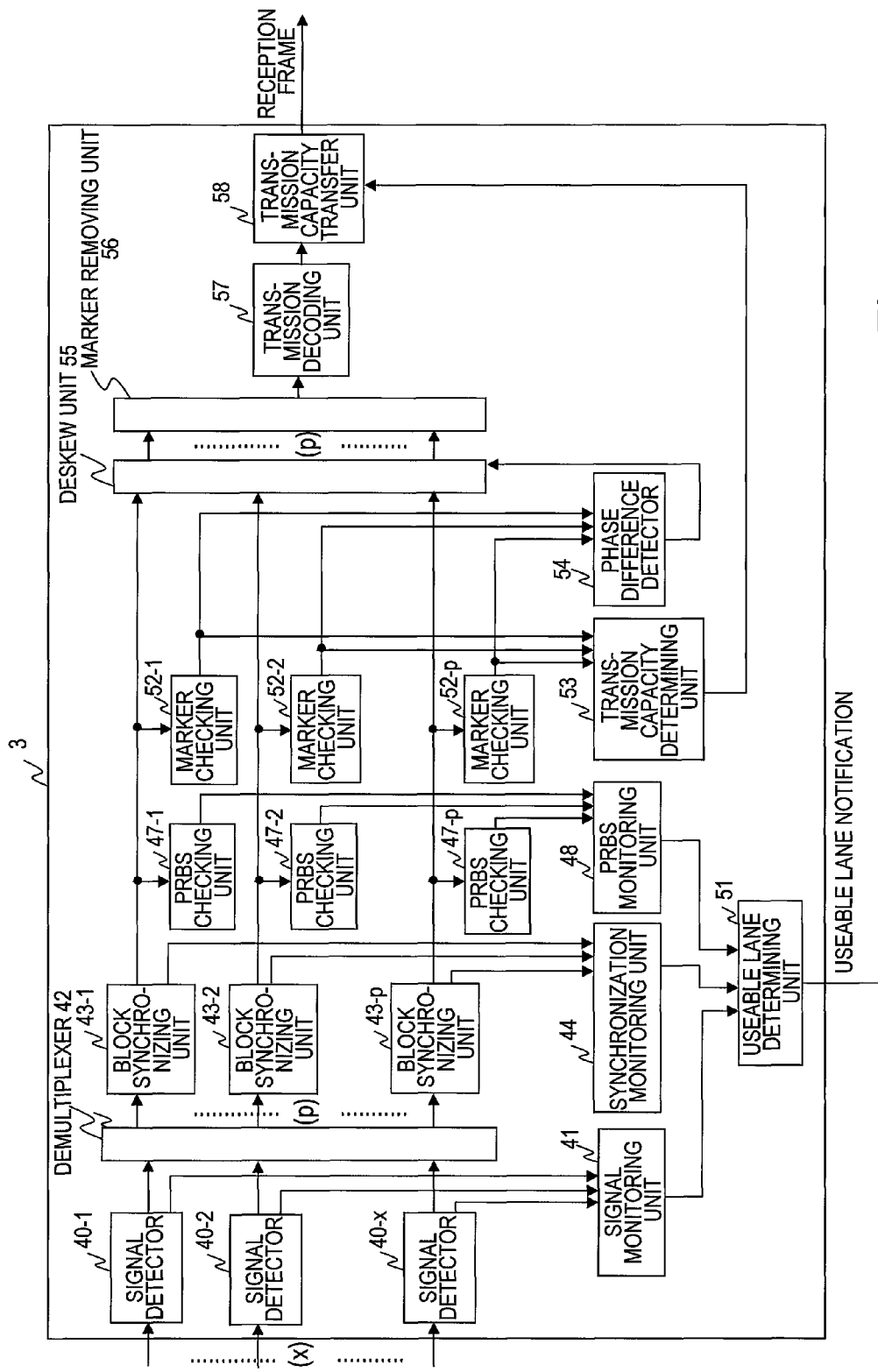
FIG. 7 is a block diagram illustrating a receiver according to the second embodiment of this invention.

FIG. 7 is a block diagram illustrating the receiver 3 according to the second embodiment of this invention.

The receiver 3 of the second embodiment receives an input from the second transmission path (or the last transmission path) constituted of x transmission lanes, and outputs reception frame data (hereinafter referred to as reception data) and useable lane information.

The receiver 3 includes the signal detectors (40-1 to 40-x), the signal monitoring unit 41, the demultiplexer 42, the block synchronizing units (43-1 to 43-p), the synchronization monitoring unit 44, PRBS checking units (47-1 to 47-p), a PRBS monitoring unit 48, the useable lane determining unit 51, the marker checking units (52-1 to 52-p), the transmission capacity determining unit 53, the phase difference detector 54, the deskew unit 55, the marker removing unit 56, the transmission decoding unit 57, and the transmission capacity transfer unit 58.

The receiver 3 of the second embodiment differs from that of the first embodiment in that the PRBS checking units (47-1 to 47-p) and the PRBS monitoring unit 48 are provided, and the failure notification detectors (49-1 to 49-p) and the failure notification monitoring unit 50 are omitted.

The data flow of the receiver 3 is described first.

Data streams output from the repeater 2 through the second transmission path are separately input to the signal detectors (40-1 to 40-x). The signal detectors (40-1 to 40-x) output data streams to the demultiplexer 42 and to the signal monitoring unit 41. The signal monitoring unit 41 outputs data streams to the useable lane determining unit 51.

The demultiplexer 42 includes p output units from which data streams are output to the p block synchronizing units (43-1 to 43-p) separately. The block synchronizing units (43-1 to 43-p) separately output data streams to the synchronization monitoring unit 44, the PRBS checking units (47-1 to 47-p), the marker checking units (52-1 to 52-p), and the deskew unit 55. The synchronization monitoring unit 44 outputs data streams to the useable lane determining unit 51.

The PRBS checking units (47-1 to 47-p) separately output data streams to the PRBS monitoring unit 48. The PRBS monitoring unit 48 outputs data streams to the useable lane determining unit 51.

The useable lane determining unit 51 outputs data streams to the transmitter 1. The marker checking units (52-1 to 52-p) outputs data streams to the transmission capacity determining unit 53 and the phase difference detector 54.

The transmission capacity determining unit 53 outputs data streams to the transmission capacity transfer unit 58. The phase difference detector 54 outputs data streams to the deskew unit 55. The deskew unit 55 includes p virtual lanes through which data streams are output to the marker removing unit 56. The marker removing unit 56 outputs data streams to the transmission decoding unit 57. The transmission decoding unit 57 outputs data streams to the transmission capacity transfer unit 58. The transmission capacity transfer unit 58 ultimately outputs reception data.

The operation of the receiver 3 of the second embodiment is described next. The signal detectors (40-1 to 40-x), the signal monitoring unit 41, the demultiplexer 42, the synchronization monitoring unit 44, the useable lane determining unit 51, the marker checking units (52-1 to 52-p), the transmission capacity determining unit 53, the phase difference detector 54, the deskew unit 55, the marker removing unit 56, the transmission decoding unit 57, and the transmission capacity transfer unit 58 in the receiver 3 of the second embodiment operate the same way as in the first embodiment. A description of these components is therefore omitted here.

The block synchronizing units (43-1 to 43-p) synchronize code blocks of transmission data encoded in the transmission encoding unit 13 of the transmitter 1, align the code blocks for each virtual lane, and separately output data streams of the aligned code blocks to the PRBS checking units (47-1 to 4'7-*p*), the marker checking units (52-1 to 52-*p*), and the deskew unit 55. The block synchronizing units (43-1 to 43-*p*) also notify block synchronization results to the synchronization monitoring unit 44.

The PRBS checking units (47-1 to 47-*p*) separately detect random bit streams inserted by the PRBS generating unit 28 and p selectors (29-1 to 29-*p*) of the repeater 2 and notify detection results to the PRBS monitoring unit 48.

The PRBS monitoring unit 48 monitors the random bit stream detection results notified from the PRBS checking units (47-1 to 4'7-*p*). When a random bit stream is detected as a result, the PRBS monitoring unit 48 determines that a failure has occurred in the relevant virtual lane of the transmission path, and notifies the determination result to the useable lane determining unit 51.

The useable lane determining unit 51 determines that the virtual lane from which the random bit stream is output is unuseable. The useable lane determining unit 51 in this embodiment determines useable lanes by the same method as in the first embodiment, based on the failure monitoring results which are provided by the signal monitoring unit 41 and the synchronization monitoring unit 44. A description of the useable lane determining method is therefore omitted here.

The second embodiment uses a random bit stream to detect a failure in a virtual lane. However, this invention is not limited thereto and can use any bit stream as long as it enables the transmission system to detect a failure.

According to the second embodiment of this invention, the use of random bit streams guaranteed in DC-balance and finite run length enables the receiver 3 to avoid malfunction and to detect a virtual lane where a failure has occurred.

Third Embodiment

A third embodiment of this invention is described with reference to FIGS. 8, 9, and 10. The third embodiment and the first embodiment use different methods to detect a failure that has occurred in a virtual lane. The following description of the third embodiment focuses on differences from the first embodiment.

Figure 8:
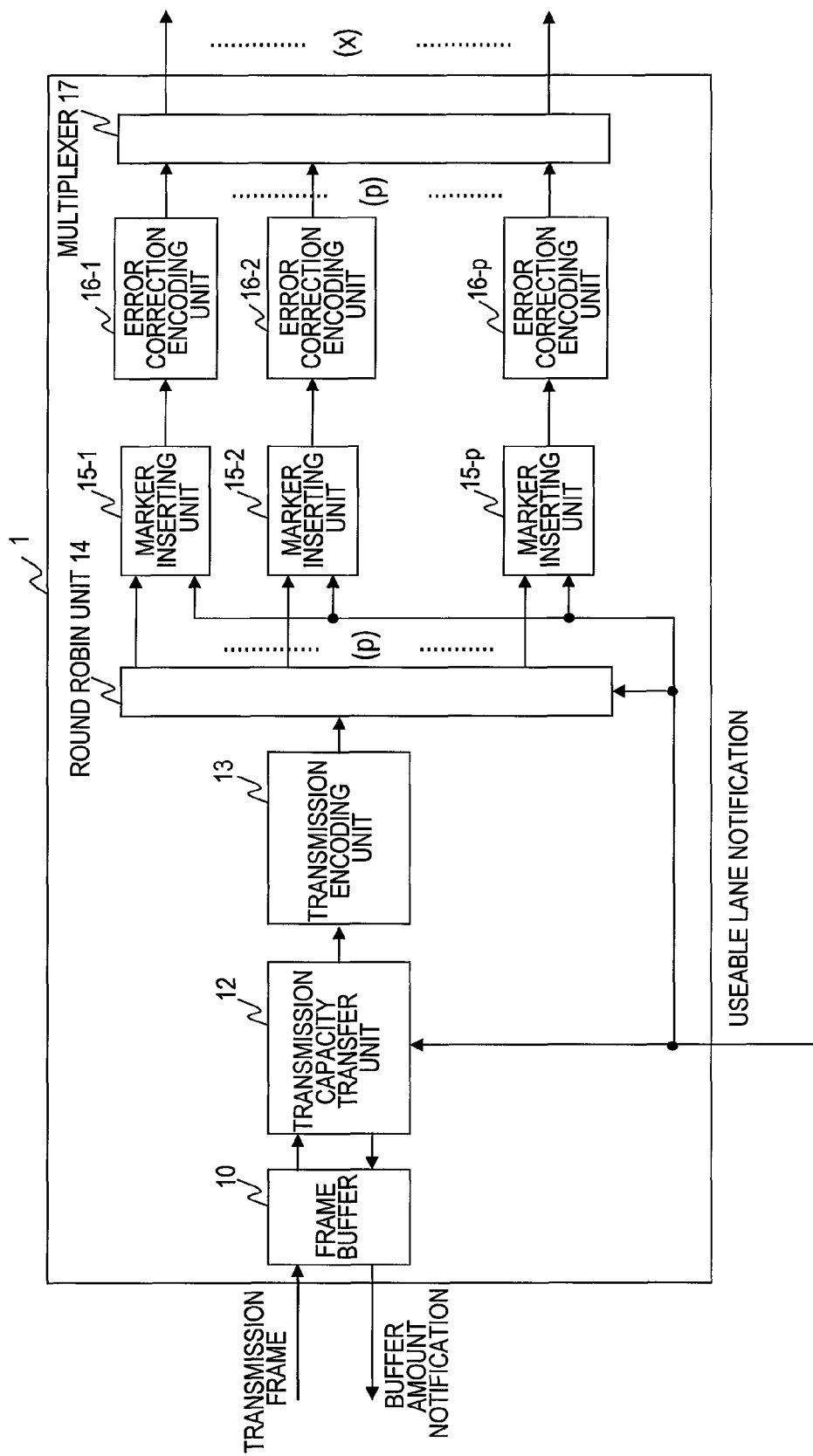
FIG. 8 is a block diagram illustrating a transmitter according to a third embodiment of this invention.

FIG. 8 is a block diagram illustrating the transmitter 1 according to the third embodiment of this invention.

The transmitter 1 includes the frame buffer 10, the transmission capacity transfer unit 12, the transmission encoding unit 13, the round robin unit 14, the marker inserting units 15 (15-1 to 15-*p*), error correction encoding units (16-1 to 16-*p*), and the multiplexer 17.

The transmitter 1 of the third embodiment differs from that of the first embodiment in that the error correction encoding units (16-1 to 16-*p*) are provided between the marker inserting units (15-1 to 15-*p*) and the multiplexer 17.

The data flow of the error correction encoding units (16-1 to 16-*p*) is as follows:

The error correction encoding units (16-1 to 16-*p*) receive an input of data streams from the marker inserting units (15-1 to 15-*p*) and output data streams to the multiplexer 17.

The operation of the error correction encoding units (16-1 to 16-*p*) is as follows:

The error correction encoding units (16-1 to 16-*p*) calculate error correcting parity data by an error correction code generating polynomials for data streams input from the marker inserting units (15-1 to 15-*p*). The error correction encoding units (16-1 to 16-*p*) insert the calculated error correcting parity data into the input data streams, and output the data streams to the multiplexer 17.

The data flows and detailed operations of the rest of the components are the same as in the transmitter 1 of the first embodiment. Descriptions thereof are therefore omitted here.

Figure 9:
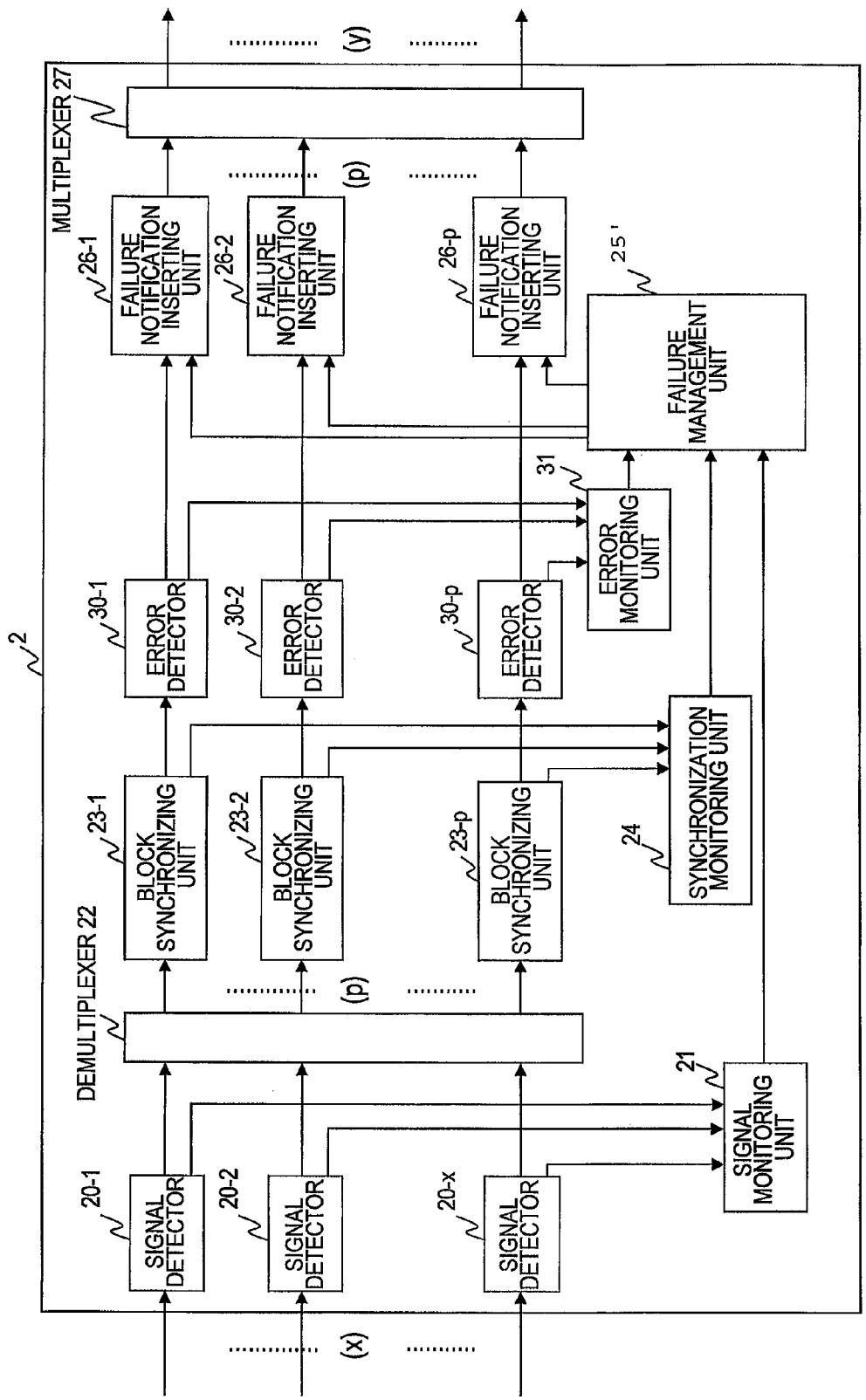
FIG. 9 is a block diagram illustrating a repeater according to the third embodiment of this invention.

FIG. 9 is a block diagram illustrating the repeater 2 according to the third embodiment of this invention.

The repeater 2 includes the x signal detectors (20-1 to 20-*x*), the signal monitoring unit 21, the demultiplexer unit 22, the p block synchronizing units (23-1 to 23-*p*), the synchronization monitoring unit 24, p error detectors (30-1 to 30-*p*), an error monitoring unit 31, a failure management unit 25', the p failure notification inserting units (26-1 to 26-*p*), and the multiplexer 27.

The repeater 2 of the third embodiment differs from that of the first embodiment in that the error monitoring unit 31 is provided as well as the p error detectors (30-1 to 30-*p*), which are placed between the block synchronizing units (23-1 to 23-*p*) and the failure notification inserting units (26-1 to 26-*p*).

Another difference from the repeater 2 of the first embodiment is that the error monitoring unit 31 outputs data streams that are input from the p error detectors (30-1 to 30-*p*) to the failure management unit 25', replacing the failure management unit 25.

The p error detectors (30-1 to 30-*p*) of the repeater 2 in the third embodiment use the error correcting parity data inserted by the error correction encoding units (16-1 to 16-*p*) of the transmitter 1 to detect errors in transmitted data streams, and notify results of the detection to the error monitoring unit 31.

Based on the error detection results which are notified from the error detectors (30-1 to 30-*p*), the error monitoring unit 31 calculates an error rate for each virtual lane and notifies the error rate to the failure management unit 25'.

Based on the transmission lane-basis failure notification from the signal monitoring unit 21 and the virtual lane-basis block synchronization failure notification from the synchronization monitoring unit 24 and the virtual lane-basis error rate notification from the error monitoring unit 31, the failure management unit 25' identifies which virtual lane is suffering a failure. The failure management unit 25' labels the identified virtual lane as a fault lane, and notifies the identification result to the failure notification inserting units (26-1 to 26-*p*).

The data flows and detailed operations of the rest of the components are the same as in the repeater 2 of the first embodiment. Descriptions thereof are therefore omitted here.

Figure 10:
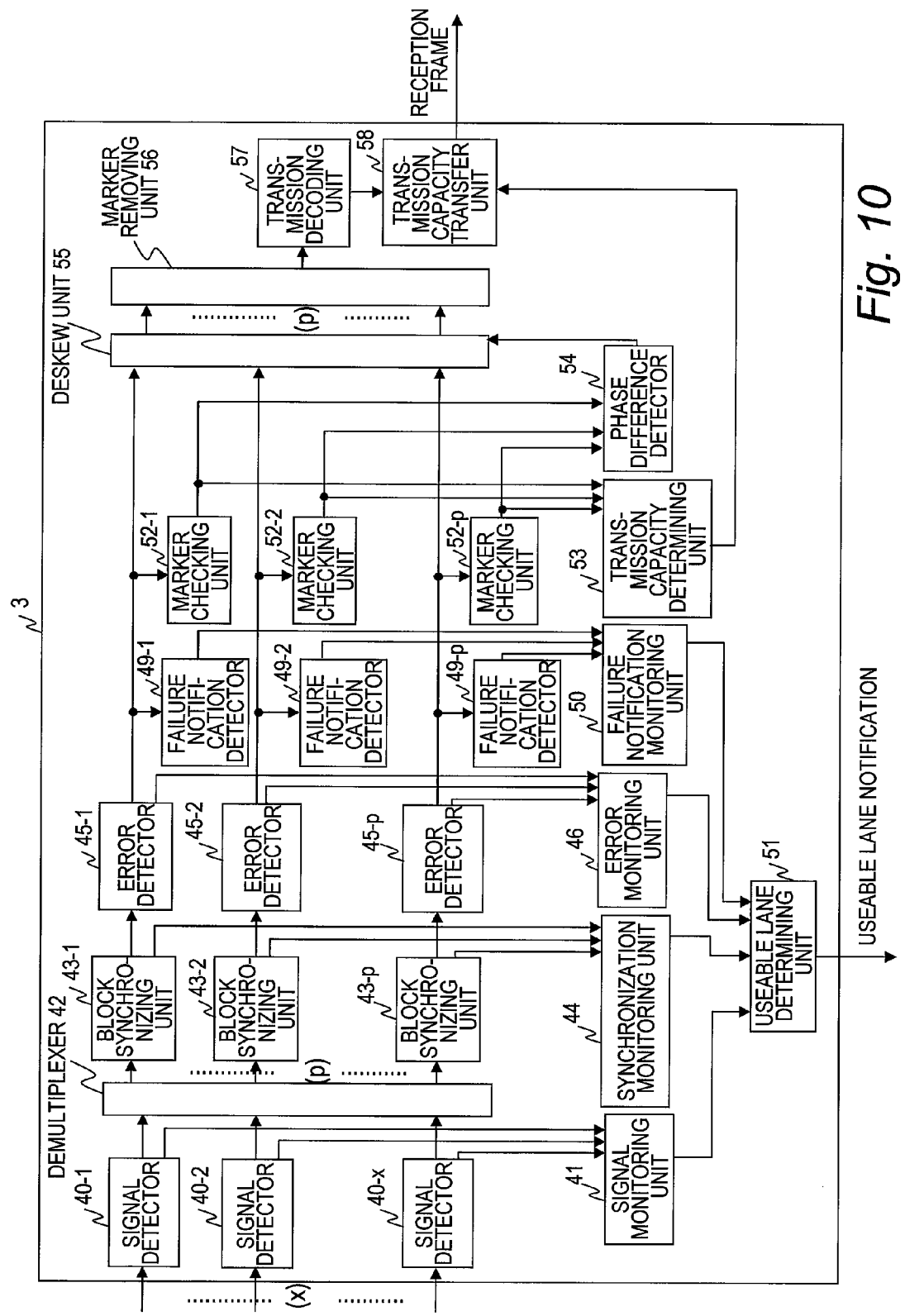
FIG. 10 is a block diagram illustrating a receiver according to the third embodiment of this invention.

FIG. 10 is a block diagram illustrating the receiver 3 according to the third embodiment of this invention.

The receiver 3 includes the signal detectors (40-1 to 40-*x*), the signal monitoring unit 41, the demultiplexer 42, the block synchronizing units (43-1 to 43-*p*), the synchronization monitoring unit 44, p error detectors (45-1 to 45-*p*), an error monitoring unit 46, the failure notification detectors (49-1 to 49-*p*), the failure notification monitoring unit 50, the useable lane determining unit 51, the marker checking units (52-1 to 52-*p*), the transmission capacity determining unit 53, the phase difference detector 54, the deskew unit 55, the marker removing unit 56, the transmission decoding unit 57, and the transmission capacity transfer unit 58.

The receiver 3 of the third embodiment differs from that of the first embodiment in that the p error detectors (45-1 to 45-*p*) are provided between the block synchronizing units (43-1 to 43-*p*) and the deskew unit 55, and that the error monitoring unit 46 is provided and outputs data streams that are input from the p error detectors (45-1 to 45-*p*) to the useable lane determining unit 51.

The p error detectors (45-1 to 45-*p*) use the error correcting parity data inserted in the error correction encoding units (16-1 to 16-*p*) of the transmitter 1 to detect errors in transmitted data streams, and notify results of the detection to the error monitoring unit 46.

Based on the error detection results which are notified from the error detectors (45-1 to 45-*p*), the error monitoring unit 46 calculates an error rate for each virtual lane, and notifies the error rate to the useable lane determining unit 51.

Based on the error rate notified from the error monitoring unit 46, the useable lane determining unit 51 determines that a failure has occurred in a virtual lane when, for example, the error rate of the virtual lane is equal to or more than a preset threshold, and labels this virtual lane as unuseable.

Alternatively, based on the error rate notified from the error monitoring unit 46, the useable lane determining unit 51 may determine that a failure has occurred in a virtual lane when the error rate has a rate of climb that is equal to or more than a preset threshold in an arbitrary time interval, and label this virtual lane as unuseable.

The useable lane determining unit 51 in this embodiment determines useable lanes by the same method as in the first embodiment, based on the failure monitoring results which are provided by the signal monitoring unit 41, the synchronization monitoring unit 44, and the failure notification monitoring unit 50. A description of the useable lane determining method is therefore omitted here.

The error detectors (45-1 to 45-*p*) are employed because, in some cases, detection that uses the block synchronizing units (43-1 to 43-*p*) takes time to unlock block synchronization and hinders the transmission system from dealing with a failed virtual lane promptly. Failure detection that uses the error detectors (43-1 to 43-*p*), on the other hand, enables through the monitoring of the error rate the transmission system to take action before a failure occurs in a virtual lane. A failure is thus detected accurately in the third embodiment.

According to the third embodiment, a failure in a virtual lane is detected with precision and the failure is dealt with quickly.

Fourth Embodiment

A fourth embodiment of this invention is described with reference to FIGS. 11 and 12. The fourth embodiment is a combination of the second embodiment and the third embodiment. The transmitter 1 of the fourth embodiment is the same as the transmitter 1 of the third embodiment, and a description thereof is therefore omitted here.

Figure 11:
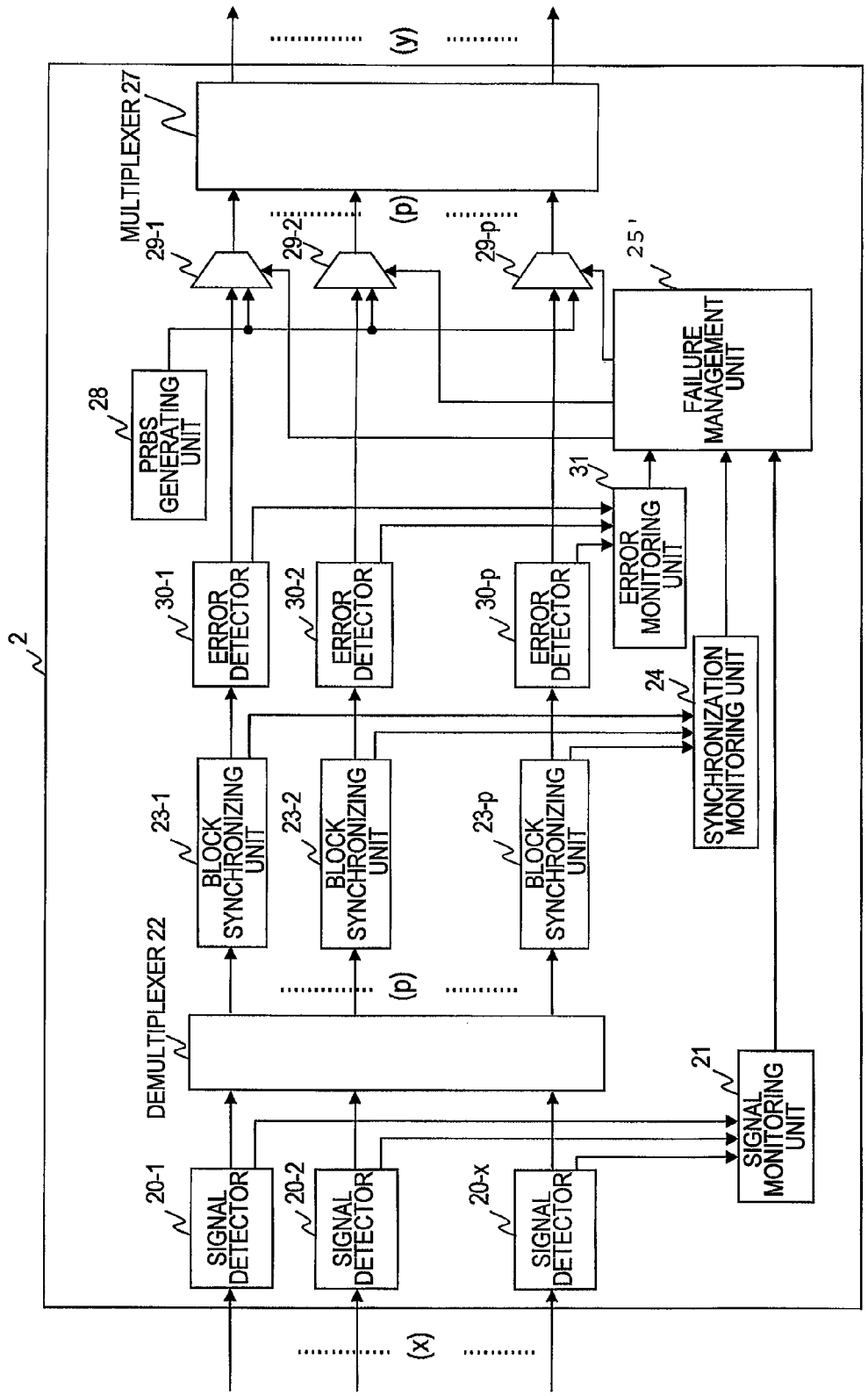
FIG. 11 is a block diagram illustrating a repeater according to a fourth embodiment of this invention.

FIG. 11 is a block diagram illustrating the repeater 2 according to the fourth embodiment of this invention. The repeater 2 includes the x signal detectors (20-1 to 20-*x*), the signal monitoring unit 21, the demultiplexer unit 22, the p block synchronizing units (23-1 to 23-*p*), the synchronization monitoring unit 24, the p error detectors (30-1 to 30-*p*), the error monitoring unit 31, the failure management unit 25', the PRBS generating unit 28, the p selectors (29-1 to 29-*p*), and the multiplexer 27.

Figure 12:
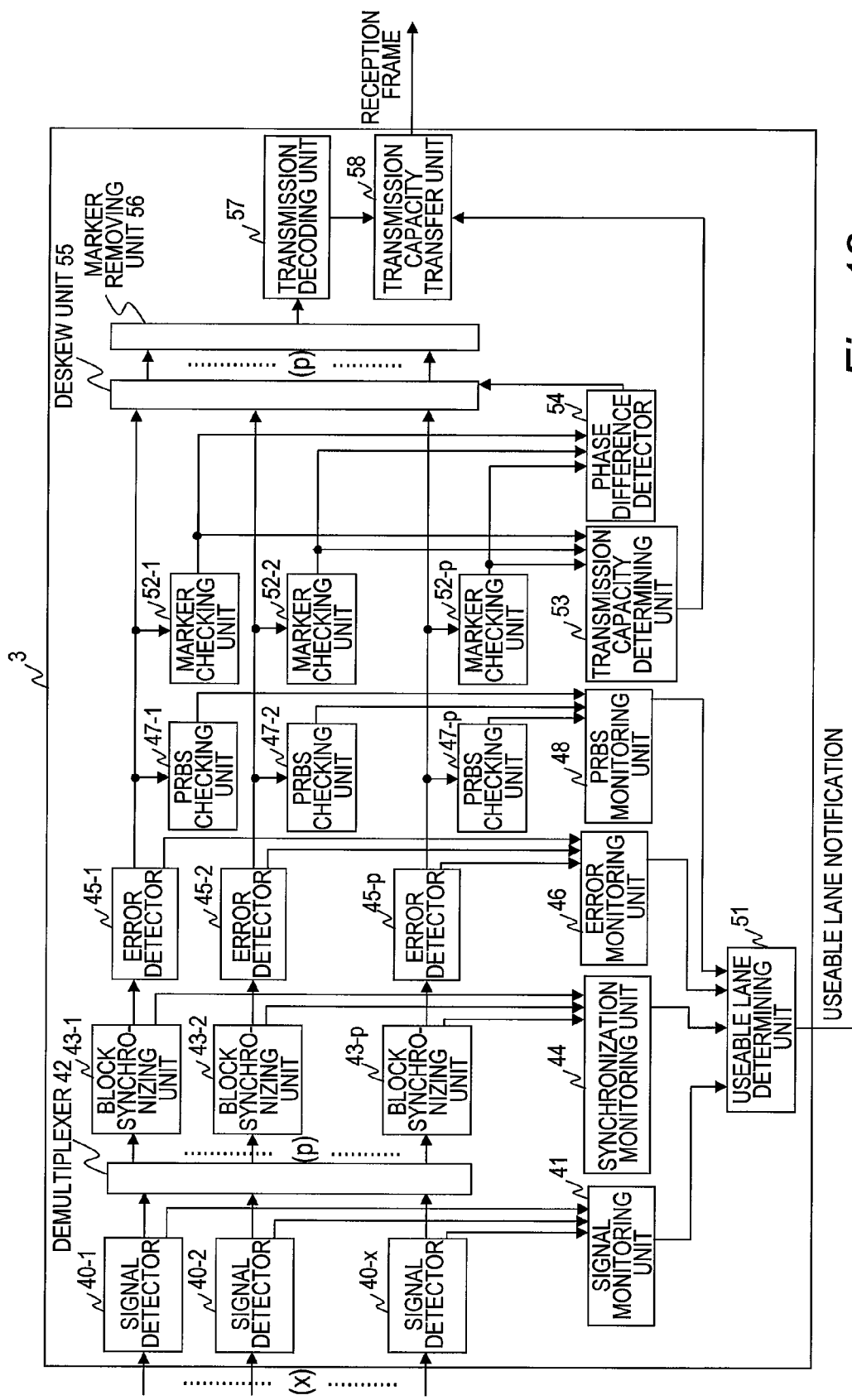
FIG. 12 is a block diagram illustrating a receiver according to the fourth embodiment of this invention.

FIG. 12 is a block diagram illustrating the receiver 3 according to the fourth embodiment of this invention. The receiver 3 includes the signal detectors (40-1 to 40-*x*), the signal monitoring unit 41, the demultiplexer 42, the block synchronizing units (43-1 to 43-*p*), the synchronization monitoring unit 44, the p error detectors (45-1 to 45-*p*), the error monitoring unit 46, the PRBS checking units (47-1 to 4'7-*p*), the PRBS monitoring unit 48, the useable lane determining unit 51, the marker checking units (52-1 to 52-*p*), the transmission capacity determining unit 53, the phase difference detector 54, the deskew unit 55, the marker removing unit 56, the transmission decoding unit 57, and the transmission capacity transfer unit 58.

While the present invention has been described in detail and pictorially in the accompanying drawings, the present invention is not limited to such detail but covers various obvious modifications and equivalent arrangements, which fall within the purview of the appended claims.

What is claimed is:

1. A transmission system for data transmission, comprising:
a transmitter;
a repeater; and
a receiver,
the transmitter sending data to the receiver,
the repeater receiving the data sent from the transmitter and transferring the received data to the receiver,
the receiver receiving the data sent from the repeater,
wherein the transmission system includes a first transmission path for coupling the transmitter and the repeater which receives the transmission data from the transmitter, and a second transmission path for coupling the receiver and the repeater, which sends the transmission data to the receiver,
wherein the first transmission path is configured with a first number of transmission lanes bundled together,
wherein the second transmission path is configured with a second number of transmission lanes bundled together,
wherein the transmitter, the repeater and the receiver have virtual lanes that can demultiplex data streams output from the first number of transmission lanes and multiplex data streams output from the virtual into the second number of transmission lanes,
wherein the transmitter is configured to:
demultiplex the transmission data into as many data streams as a number of useable virtual lanes based on useable lane information including information about the usable virtual lanes which is sent from the receiver;
insert the useable lane information and identifications for identifying the virtual lanes from which the data streams are output into the data streams output from the virtual lanes;
multiplex the data streams output from the virtual lanes into as many streams as the number of the transmission lanes of the first transmission path; and
send the multiplexed data streams to the repeater from the transmission lanes included in the first transmission path, so as to send the transmission data to the repeater,
wherein the repeater is configured to:
receive the multiplexed data streams from the transmission lanes included in the first transmission path;
demultiplex the received data streams into as many data streams as a number of the useable virtual lanes based on the useable lane information inserted in the received data streams;
monitor failures of the transmission lanes of the first transmission path and the virtual lanes;
insert failure notification information into a data stream that is output from a virtual lane which has failed;
multiplex the data streams output from the virtual lanes into as many streams as a number of the transmission lanes of the second transmission path; and
send the multiplexed data streams from the transmission lanes included in the second transmission path to one of the receiver and another repeater, so as to send the transmission data to the one of the receiver and the another repeater, and wherein the receiver is configured to:
receive the multiplexed data streams from the transmission lanes included in the second transmission path;
demultiplex the received data streams into as many data streams as the number of the useable virtual lanes based on the useable lane information inserted into the received data streams;
detect the identifications from the received data streams;
monitor failures of the transmission lanes of the second transmission path and the virtual lanes;
detect a fault lane based on results of the failure monitoring of the transmission lanes;
select the useable virtual lanes based on the failure notification information and a result of the fault lane detection;
send to the transmitter the useable lane information that includes information about the determined useable virtual lanes;
correct a wrong order of arrival of the received data streams and a shift of reception point in the virtual lanes which are caused by a skew of the data streams between the transmission lanes based on the detected identifications; and
restore the demultiplexed data streams into the transmission data.

2. The transmission system according to claim 1,
wherein the repeater is further configured to:
monitor signals of data streams output from the transmission lanes of the first transmission path;
determine a transmission lane included in the first transmission path being a fault lane in a case where a strength of the signal including the data stream output from the transmission lane is less than a predetermined threshold;
monitor synchronization of the data streams output from the virtual lanes;
determine the virtual lane being a fault lane in a case where synchronization of the data stream output from the virtual lane is unlocked; and
insert a data stream representing the virtual lane being a fault lane as the failure notification information into the data stream sent from the virtual lane that has been determined as the fault lane, and
wherein the receiver detects the fault lane among the first transmission path, the second transmission path, and the virtual lanes by monitoring whether the failure notification information is inserted.

3. The transmission system according to claim 2, wherein the receiver is further configured to:
monitor signals of data streams output from the transmission lanes of the second transmission path;
determine a transmission lane of the second transmission path being a fault lane in a case where a strength of the signal including the data stream output from the transmission lane is less than a predetermined threshold;
monitor synchronization of the data streams output from the virtual lanes;
determine the virtual lane being a fault lane in a case where synchronization of the data stream output from the virtual lane is unlocked;
monitor the data streams output from the virtual lanes;
determine the virtual lane being a fault lane in a case where the failure notification information is inserted in the data stream output from the virtual lane;
select the useable virtual lanes based on results of the determinations so that the fault lane is excluded in a case of the selecting the useable virtual lanes;
create the useable lane information including information about the determined useable virtual lanes; and
send the created useable lane information to the transmitter.

4. The transmission system according to claim 2, wherein the failure notification information output from the repeater is a DC-balanced data stream.

5. The transmission system according to claim 1,
wherein the transmitter is further configured to:
calculate an error correcting code based on the data streams to be output from the virtual lanes; and
insert the calculated error correcting code to the data streams output from the virtual lanes,
wherein the repeater is further configured to:
monitor signals of data streams output from the transmission lanes included in the first transmission path;
determine a transmission lane included in the first transmission path being a fault lane in a case where a strength of the signal including the data stream output from the transmission lane is less than a predetermined threshold;
calculate error rates of the virtual lanes based on the error correcting code inserted in the data streams output from the first transmission path;
determine the fault lane among the virtual lanes based on the calculated error rates;
monitor synchronization of the data streams output from the virtual lanes;
determine the virtual lane being a fault lane in a case where synchronization of the data stream output from the virtual lane is unlocked; and
insert a data stream representing the virtual lane being a fault lane as the failure notification information into the data stream sent from the virtual lane that has been determined as the fault lane, and
wherein the receiver detects the fault lane among the first transmission path, the second transmission path, and the virtual lanes by monitoring whether the failure notification information is inserted.

6. The transmission system according to claim 5, wherein, in the selecting the fault lane among the virtual lanes based on the calculated error rates, it is determined that the virtual lane that outputs a data stream having the calculated error rate that is more than a predetermined threshold, and the virtual lane that outputs a data stream having the calculated error rate with a rate of climb that is more than a predetermined threshold are the fault lane.

7. The transmission system according to claim 5, wherein the receiver is further configured to:
monitor signals of data streams output from the transmission lanes of the second transmission path;
determine a transmission lane of the second transmission path being a fault lane in a case where a strength of the signal including the data stream output from the transmission lane is less than a predetermined threshold;
monitor synchronization of the data streams output from the virtual lanes;
determine the virtual lane being a fault lane in a case where synchronization of the data stream output from the virtual lane is unlocked;
calculate error rates of the virtual lanes from the error correcting code inserted to the data streams output from the virtual lanes;
determine the fault lane among the virtual lanes based on the calculated error rates;
determine the virtual lane is the fault lane in a case where the failure notification information is inserted in the data stream output from the virtual lane;

select the useable virtual lanes based on results of the determinations so that the fault lane is excluded in a case of the selecting the useable virtual lanes;

create the useable lane information including information about the determined useable virtual lanes; and send the created useable lane information to the transmitter.

8. The transmission system according to claim 7, wherein, in the selecting the fault lane among the virtual lanes based on the calculated error rates, it is determined that the virtual lane that outputs a data stream having the calculated error rate that is more than a predetermined threshold, and the virtual lane that outputs a data stream having the calculated error rate with a rate of climb that is more than a predetermined threshold are the fault lane.

9. A repeater implemented in a data transmission system including a transmitter and a receiver, the transmitter sending data to the receiver, the receiver receiving the data sent from the repeater, the repeater receiving the data sent from the transmitter and transferring the received data to the receiver, wherein the transmitter is coupled to the repeater, which receives the data sent from the transmitter, by a first transmission path, wherein the repeater, which sends the data to the receiver, is coupled to the receiver by a second transmission path, wherein the first transmission path is configured with a first number of transmission lanes bundled together, wherein the second transmission path is configured with a second number of transmission lanes bundled together, wherein the transmitter, the repeater and the receiver have a number of virtual lanes that can be multiplexed into the first number of transmission lanes and the second number of transmission lanes, and wherein the repeater is configured to:

receive multiplexed data streams from the transmission lanes included in the first transmission path;

demultiplex the received data streams into as many data streams as the number of the useable virtual lanes based on useable lane information, which is inserted in the data streams sent from the transmitter and includes information about the useable virtual lanes;

monitor failures of the transmission lanes of the first transmission path and the virtual lanes;

insert failure notification information into a data stream that is output from a virtual lane which has failed;

multiplex data streams output from the virtual lanes into as many streams as the number of the transmission lanes of the second transmission path; and send the multiplexed data streams from the transmission lanes included in the second transmission path to one of the receiver and another repeater, so as to send the transmission data to the one of the receiver and the another repeater.

10. The repeater according to claim 9, which is further configured to:

monitor signals of data streams output from the transmission lanes of the first transmission;

determine a transmission lane included in the first transmission path being a fault lane in a case where a strength of the signal including the data stream output from the transmission lane is less than a predetermined threshold;

monitor synchronization of the data streams output from the virtual lanes;

determine the virtual lane being a fault lane in a case where synchronization of the data stream output from the virtual lane is unlocked; and insert a data stream representing the virtual lane being a fault lane as the failure notification information into the data stream sent from the virtual lane that has been determined as the fault lane.

11. The repeater according to claim 10, which is further configured to insert a DC-balanced data stream as the failure notification information.

12. The repeater according to claim 9, which is further configured to:

monitor signals of data streams output from the transmission lanes included in the first transmission path;

determine a transmission lane included in the first transmission path being a fault lane in a case where a strength of the signal including the data stream output from the transmission lane is less than a predetermined threshold;

calculate error rates of the virtual lanes based on error correcting code calculated by the transmitter which is inserted in the data streams output from the first transmission path;

determine the fault lane among the virtual lanes based on the calculated error rates;

monitor synchronization of the data streams output from the virtual lanes;

determine the virtual lane being a fault lane in a case where synchronization of the data stream output from the virtual lane is unlocked; and insert a data stream representing the virtual lane being a fault lane as the failure notification information into the data stream sent from the virtual lane that has been determined as the fault lane.

13. The repeater according to claim 12, wherein, in the selecting the fault lane among the virtual lanes based on the calculated error rates, it is determined that the virtual lane that outputs a data stream having the calculated error rate that is more than a predetermined threshold, and the virtual lane that outputs a data stream having the calculated error rate with a rate of climb that is more than a predetermined threshold are the fault lane.

14. A receiver implemented in a data transmission system including a transmitter and a repeater, the transmitter sending data to the receiver, the repeater transferring the data sent from the transmitter, the receiver receiving the data sent from the repeater, wherein the transmitter is coupled to the repeater, which receives the data sent from the transmitter, by a first transmission path, wherein the repeater, which sends the data to the receiver, is coupled to the receiver by a second transmission path, wherein the first transmission path is configured with a first number of transmission lanes bundled together, wherein the second transmission path is configured with a second number of transmission lanes bundled together, wherein the transmitter, the repeater and the receiver have a number of virtual lanes that can be multiplexed into the first number of transmission lanes and the second number of transmission lanes, and wherein the receiver is configured to:

receive multiplexed data streams from the transmission lanes included in the second transmission path;

demultiplex the received data streams into as many data streams as the number of the useable virtual lanes based on useable lane information including information about the usable virtual lanes which is inserted in the received data streams;

detect identifications for identifying the virtual lanes, which is inserted by the transmitter, from the received data streams;

monitor failures of the transmission lanes of the second transmission path and the virtual lanes;

detect a fault lane based on results of the failure monitoring of the transmission lanes;

select the useable virtual lanes based on a result of the fault lane detection and failure notification information which is sent from the repeater and inserted in a data stream that is output from a virtual lane which has failed;

send to the transmitter the useable lane information that includes information about the determined useable virtual lanes;

correct a wrong order of arrival of the received data streams and a shift of reception point in the virtual lanes which are caused by a skew of the data streams between the transmission lanes based on the detected identifications; and restore the demultiplexed data streams into the transmission data.

15. The receiver according to claim 14, which is further configured to:

monitor signals of data streams output from the transmission lanes of the second transmission path;

determine a transmission lane of the second transmission path being a fault lane in a case where a strength of the signal including the data stream output from the transmission lane is less than a predetermined threshold;

monitor synchronization of the data streams output from the virtual lanes;

determine the virtual lane being a fault lane in a case where synchronization of the data stream output from the virtual lane is unlocked;

monitor the data streams output from the virtual lanes;

determine the virtual lane being a fault lane in a case where the failure notification information is inserted by the repeater in the data stream output from the virtual lane;

select the useable virtual lanes based on results of the determination so that the fault lane is excluded in a case of the selecting the useable virtual lanes;

create the useable lane information including information about the determined useable virtual lanes; and send the created useable lane information to the transmitter.

16. The receiver according to claim 15, wherein the failure notification information output from the repeater is a DC-balanced data stream.

17. The receiver according to claim 14, which is further configured to:

monitor signals of data streams output from the transmission lanes of the second transmission path;

determine a transmission lane of the second transmission path being a fault lane in a case where a strength of the signal including the data stream output from the transmission lane is less than a predetermined threshold;

monitor synchronization of the data streams output from the virtual lanes;

determine the virtual lane being a fault lane in a case where synchronization of the data stream output from the virtual lane is unlocked;

calculate error rates of the virtual lanes from error correcting code inserted to the data streams output from the virtual lanes which is calculated by the transmitter and;

determine the fault lane among the virtual lanes based on the calculated error rates;

determine the virtual lane is the fault lane in a case where the failure notification information is inserted in the data stream output from the virtual lane;

select the useable virtual lanes based on results of the determinations so that the fault lane is excluded in a case of the selecting the useable virtual lanes;

create the useable lane information including information about the determined useable virtual lanes; and send the created useable lane information to the transmitter.

18. The receiver according to claim 17, wherein, in the selecting the fault lane among the virtual lanes based on the calculated error rates, it is determined that the virtual lane that outputs a data stream having the calculated error rate that is more than a predetermined threshold, and the virtual lane that outputs a data stream having the calculated error rate with a rate of climb that is more than a predetermined threshold are the fault lane.

* * * * *